United States Patent
Tarrant

(10) Patent No.: US 9,620,791 B2
(45) Date of Patent: Apr. 11, 2017

(54) FLOW CELL WITH CORRUGATED FLOW SCREEN

(71) Applicant: ViZn Energy Systems, Inc., Columbia Falls, MT (US)

(72) Inventor: Derek C. Tarrant, Kalispell, MT (US)

(73) Assignee: ViZn Energy Systems, Inc., Columbia Falls, MT (US)

( * ) Notice: Subject to any disclaimer, the term of this patent is extended or adjusted under 35 U.S.C. 154(b) by 0 days.

(21) Appl. No.: 14/832,500

(22) Filed: Aug. 21, 2015

(65) Prior Publication Data

US 2017/0054160 A1    Feb. 23, 2017

(51) Int. Cl.
*H01M 4/00* (2006.01)
*H01M 8/0254* (2016.01)
*H01M 8/18* (2006.01)
*H01M 8/20* (2006.01)

(52) U.S. Cl.
CPC ......... *H01M 8/0254* (2013.01); *H01M 8/188* (2013.01); *H01M 8/20* (2013.01)

(58) Field of Classification Search
CPC .... H01M 4/366; H01M 4/667; H01M 4/8657; H01M 4/9041; H01M 2/20; H01M 2/26
See application file for complete search history.

(56) References Cited

U.S. PATENT DOCUMENTS

| | | | |
|---|---|---|---|
| 3,926,676 A | 12/1975 | Frie et al. | |
| 6,492,045 B1 | 12/2002 | Blanchet et al. | |
| 8,343,646 B1 | 1/2013 | Wilkins et al. | |
| 8,974,940 B1 | 3/2015 | Tarrant | |
| 2006/0269830 A1* | 11/2006 | Johnsen | H01M 8/142 429/442 |
| 2008/0280180 A1* | 11/2008 | Correa | B01J 8/003 429/479 |
| 2011/0200848 A1 | 8/2011 | Chiang et al. | |
| 2011/0244277 A1 | 10/2011 | Gordon, II et al. | |

* cited by examiner

*Primary Examiner* — Emily Le
*Assistant Examiner* — Monique Wills
(74) *Attorney, Agent, or Firm* — Brooks Kushman P.C.

(57) ABSTRACT

A flow cell includes a separator and anode that define a flow cavity. The flow cell also includes an electrically conductive corrugated flow screen disposed within the cavity and electrically connected with the anode such that the flow screen, during charge, provides an electric shield to hinder deposition of metal between the anode and flow screen and to promote deposition of metal between the separator and flow screen.

15 Claims, 4 Drawing Sheets

FLOW CELL WITH CORRUGATED FLOW SCREEN

TECHNICAL FIELD

This disclosure relates to redox flow cells.

BACKGROUND

A flow battery may include one or more cells that operate to store energy provided from a source, and to discharge energy to a device to do work. Each cell may have a cathode, an anode, and a separator disposed between the cathode and anode for separating chambers of the cell that receive electrolyte. The separator may permit ionic flow between the cathode and anode chambers to facilitate energy storage in the system, as well as discharge of energy from the system.

SUMMARY

A flow cell includes a housing defining anode and cathode cavities each configured to permit electrolyte flow therethrough, an anode disposed within the anode cavity, and an ion conductive membrane separating the cavities. The flow cell further includes an electrically conductive flow screen, having a corrugated form, in contact with the anode and arranged within the anode cavity such that the flow screen provides an electric shield to limit plating between the flow screen and anode, and that peaks of the flow screen adjacent to the membrane provide preferential plating areas relative to valleys of the flow screen.

A flow cell includes a separator and anode arranged to define a flow chamber configured to direct an electrolyte therethrough, and an electrically conductive corrugated flow screen in contact with the anode. The flow screen has peak portions proximate the separator, and promotes deposition of metal between the flow screen and separator during charge to form an electric shield that hinders deposition of metal between the flow screen and anode.

A battery includes a flow cell including a separator and anode defining a flow cavity, and an electrically conductive corrugated flow screen disposed within the cavity and electrically connected with the anode such that the flow screen, during charge, provides an electric shield to hinder deposition of metal between the anode and flow screen and to promote deposition of metal between the separator and flow screen.

DETAILED DESCRIPTION

Figure 1:
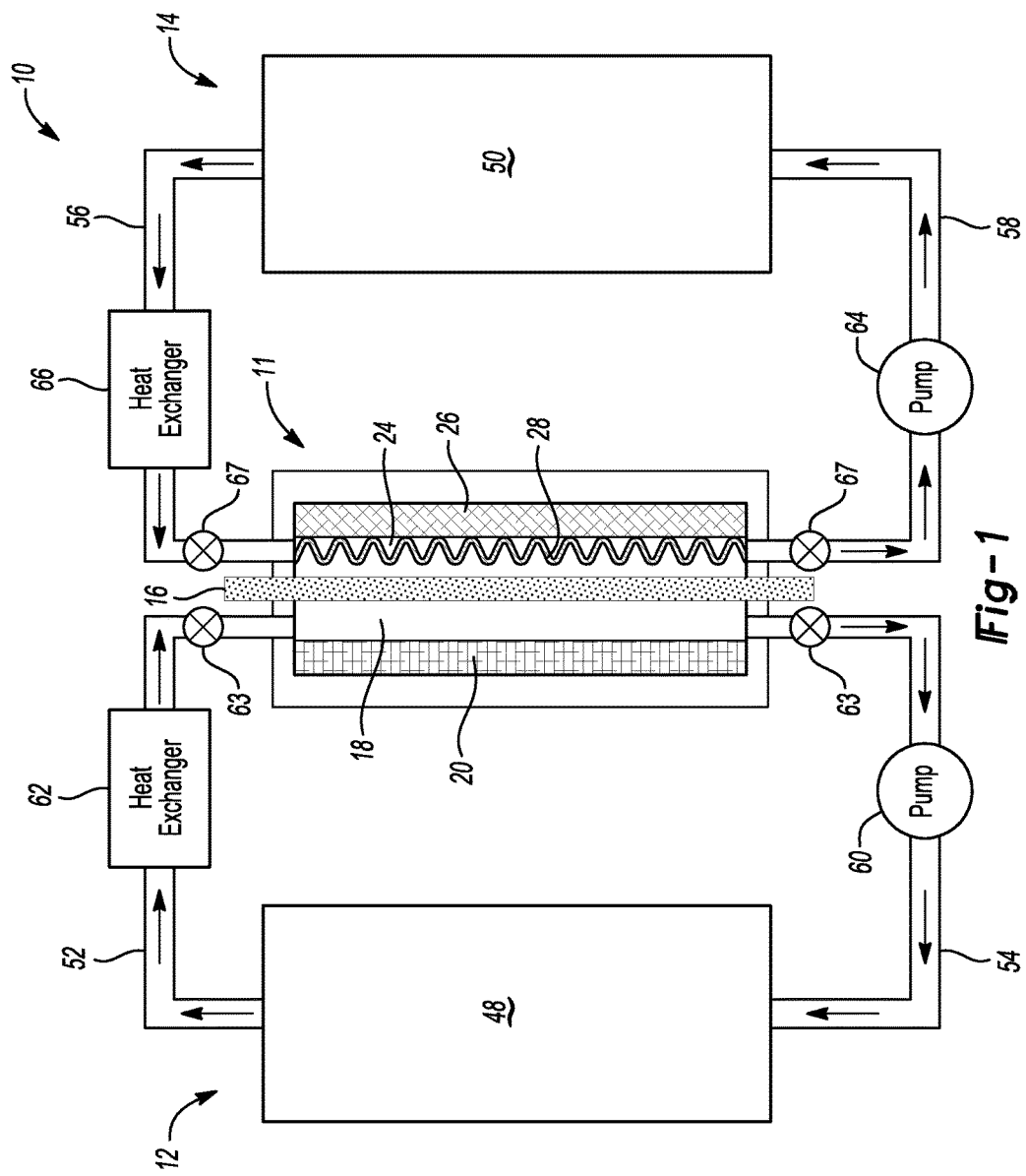
FIG. 1 is a schematic diagram of an energy storage system including a cell having a cathode, an anode, a separator between the cathode and anode, and a corrugated flow screen proximate the anode.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The unobstructed flow of electrolyte through a flow cell anode chamber may result in non-uniform plating of metal on the anode during charge: metal build-up on some areas of the anode may be different than other areas of the anode. (Regular or smooth electrolyte flow may naturally develop given chamber orientation relative to the force of gravity, chamber dimensions, port locations, etc.) These differences can become more pronounced as the charge cycle continues resulting in the flow of electrolyte being choked off to certain regions of the anode due to the close proximity of the deposit relative to the membrane separating the anode and cathode chambers.

Elements such as flow screens and other flow-obstructing devices have been introduced into the anode chamber to increase the turbulence of electrolyte flow therethrough. This turbulence tends to increase the uniformity with which deposits form, thereby generally reducing instances of anode choke-off and increasing available time for continuous charging. Normal variations in flow cell operating conditions over a sufficient number of charge cycles, however, can lead to crested anode deposit formations even in the presence of elements used to turbulize the electrolyte flow. Once these crests form, deposition in their vicinity accelerates. And thus, anode choke-off may still occur (on occasion).

It has been discovered that certain flow screen arrangements may be used to electrically shield the anode, and to influence and encourage the location of non-uniform plating of metal within the anode chamber such that deposit peaks initially form between the flow screen and separator. Further build-up in these regions may further hamper the deposition of metal between the flow screen and anode due to the increase in electric shielding effects associated with the plated metal on the flow screen to further reduce instances of anode choke-off. In certain examples, an electrically conductive waved flow screen may be electrically connected with the anode (e.g., disposed on the anode, supported by the anode via electrically conductive supports, etc.) and within the anode chamber. (Such screens may be made from metal such as copper, steel, nickel, etc.) During charge, plating may first occur on crests of the wave nearest the separator before spreading to other areas between the flow screen and separator. Corrugated, fluted, furrowed, ridged, saw-toothed and other flow screen arrangements having peak-and-valley like form that promote initial deposition of metal on a side of the flow screen nearest the separator and discourage initial deposition of metal on the anode are also contemplated herein. For ease of reference, such forms are referred to as corrugated.

It has further been discovered that sharp flow screen edges attract metal plating during charge as compared with more rounded edges. Expanded metal, which is a form of metal stock made by shearing a metal plate in a press so that the metal stretches—leaving, for example, diamond-shaped or oval-shaped voids surrounded by interlinked bars of the metal, has thus been found to be particularly effective at further promoting the preferential plating of metal when formed with corrugations. That is, crown portions of the flow screen nearest the separator encourage the formation of metal deposits during initial charge (because they are closest to the separator), and the sharp edges associate therewith further encourage the formation of metal deposits thereon. Perforated metal may also be used with similar effect.

FIG. 1 shows an energy storage system 10 configured as an electrochemical flow battery that is operable to store energy received from a source, and to discharge energy to one or more devices to do work. For example, the system 10 may be used in electrical utility applications for load leveling, power transmission deferral, wind power integration, and/or solar power integration.

The system 10 includes a flow cell 11 and first and second electrolyte supply arrangements 12 and 14, respectively, for supplying electrolytes to the cell 11 such that the system 10 forms an electrochemical reactor, as explained below in greater detail. Although the system 10 is shown with a single flow cell 11, the system 10 may include multiple flow cells 11 that are joined together in a cell stack and that each have the same or similar configuration as described below in detail. Examples of cell stacks are disclosed in U.S. patent application Ser. No. 13/196,498, which is hereby incorporated in its entirety by reference.

The cell 11 includes a cathode side and an anode side separated by a separator 16 (e.g., an ion exchange membrane). The cathode side includes a cathode chamber 18 that receives a first electrolyte, such as a catholyte, from the first electrolyte supply arrangement 12, and a first electrode, such as cathode 20. Likewise, the anode side includes an anode chamber 24 that receives a second electrolyte, such as an anolyte, from the second electrolyte supply arrangement 14; a second electrode, such as anode 26; and a corrugated flow screen 28 in the chamber 24 between the anode 26 and separator 16. Ridges of the flow screen 28, in this example, are oriented perpendicular to the direction of flow through the chamber 24. In other examples, the ridges may be oriented parallel (or otherwise) to the direction of flow, etc. In addition to enhancing the mixing of the electrolyte received in the chamber 24, the corrugated flow screen 28 may facilitate the selective deposition of material thereon as discussed in more detail below. A similar or other flow screen (not shown) may, of course, be disposed in the cathode chamber 18.

The cathode 20 and anode 26 may be made of any suitable material and may be electrically connected together to form an electric circuit. For example, the cathode 20 may be formed as a nickel coating, or other suitable coating, on an appropriately conductive or nonconductive substrate, such as a steel or plastic plate, and the anode 26 may be formed as a lead, tin, zinc, or cadmium coating, or other suitable coating, on another appropriately conductive or nonconductive substrate, such as a steel or plastic plate. If the system 10 is provided with multiple cells 11, all of the associated cathodes 20 may communicate electrically and/or ionically, and all of the associated anodes 26 may also communicate electrically and/or ionically. Furthermore, with a multiple cell configuration, the endmost electrodes may function as current collectors. In that regard, with the orientation shown in FIG. 1, the leftmost cathode may function to collect current from the other cathodes, and the rightmost anode may function to collect current from the other anodes. The leftmost cathode and the rightmost anode may also be electrically connected together to form a circuit.

The electrolyte supply arrangements 12 and 14 are configured to supply electrolytes to the chambers 18 and 24 of the cell 11, and the electrolytes function to ionically connect the electrodes 20, 26 of the cell 11. The first electrolyte supply arrangement 12 includes a first electrolyte reservoir, such as a catholyte tank 48, in fluid communication with the cathode chamber 18 for storing a catholyte, such as an aqueous solution containing an electrochemically reducible iron salt, cerium salt, halide, or vanadium oxide; water and alkali metal hydroxide or sulfuric acid; or a non-aqueous solution containing ethylammonium nitrate, imidazolium, sodium hexafluorophosphate, lithium hexafluorophosphate, lithium tetrafluoroborate and/or haloaluminate material or materials. Likewise, the second electrolyte supply arrangement 14 includes a second electrolyte reservoir, such as an anolyte tank 50, in fluid communication with the anode chamber 24 and configured to store an anolyte, such as an aqueous solution or slurry containing zinc particles, zinc oxide, iron salt, cerium salt, halide, or vanadium oxide; water and alkali metal hydroxide or sulfuric acid; or a non-aqueous solution containing ethylammonium nitrate, imidazolium, sodium hexafluorophosphate, lithium hexafluorophosphate, lithium tetrafluoroborate and/or haloaluminate material or materials. The catholyte tank 48 may be connected to a housing or body of the cell 11 via a catholyte supply line 52 and a catholyte return line 54, and the anolyte tank 50 may be connected to the housing or body of the cell 11 via an anolyte supply line 56 and an anolyte return line 58. Furthermore, the lines 52, 54, 56 and 58, or portions thereof, may be flexible and/or extendable to accommodate opening and closing of the cell 11.

The first electrolyte supply arrangement 12 may further include a catholyte circulation pump 60 for moving catholyte between the catholyte tank 48 and the cathode chamber 18, a first heat exchanger 62 for controlling temperature of the catholyte, and suitable valves 63 for controlling flow of the catholyte. Likewise, the second electrolyte supply arrangement 14 may include an anolyte circulation pump 64 for moving anolyte between the anolyte tank 50 and the anode chamber 24, a second heat exchanger 66 for controlling temperature of the anolyte, and suitable valves 67 for controlling flow of the anolyte.

When the cell 11 is in a closed position shown in FIG. 1, the system 10 may function in a charge mode or a discharge mode. In the charge mode, the system 10 accepts electrical energy from a source and stores the energy through chemical reactions. In the discharge mode, the system 10 may convert chemical energy to electrical energy, which is released to a load in order to do work. In either mode, the separator portion 16 may facilitate chemical reactions, such as oxidation and reduction reactions at the electrodes 20, 26, by allowing ions to pass therethrough from one of the chambers 18, 24 to the other of the chambers 18, 24.

The corrugated flow screen 28 positioned in the chamber 24 may provide numerous benefits during operation of the system 10. First, the flow screen 28 may enhance mixing of the electrolyte received in the chamber 24. Second, the flow screen 28 may provide support to the separator 16 when deposited metal on the flow screen 28 comes into contact with the separator 16, while also being elastic and/or compressible to allow for tolerance variations or movement during operation. Third, the flow screen 28 may function as a scaffold or other support structure that supports material that is deposited thereon during operation. For example, an expanded metal construction of the flow screen 28 may support zinc material that is deposited thereon during a charging operation. Fourth, the flow screen 28 may function as a filter that traps particles that may break off from the material deposited thereon. Fifth, the flow screen 28 may cover or mask portions of the electrode 26 to thereby increase current density in exposed portions of the electrode 26 during operation. The increased current density may enhance deposition or plating of material, such as zinc, during the charging operation.

Figure 2A:
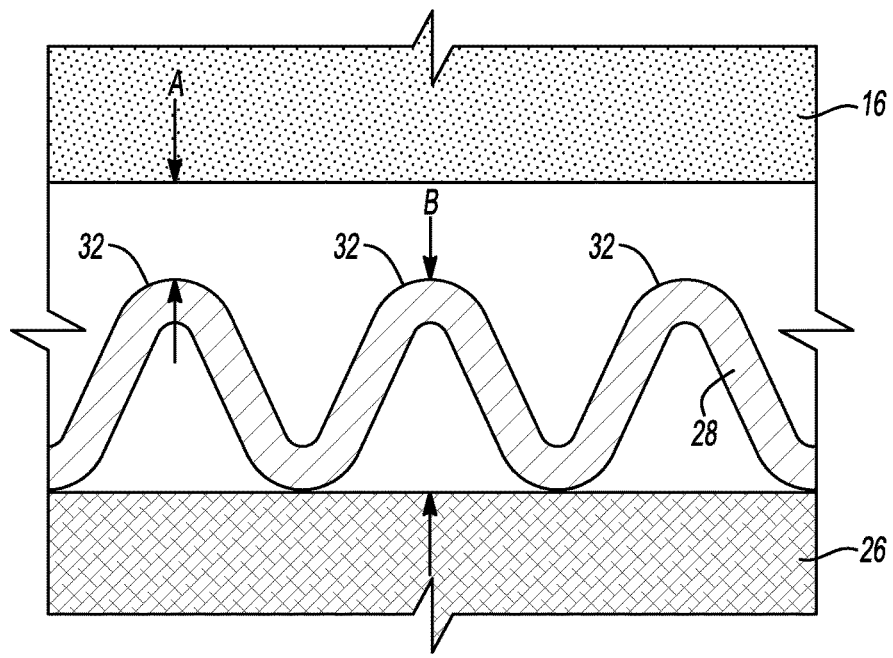
FIGS. 2A-2D are schematic diagrams of the anode, corrugated flow screen and separator of FIG. 1 at different points in time during a charge operation.
Figure 2B:
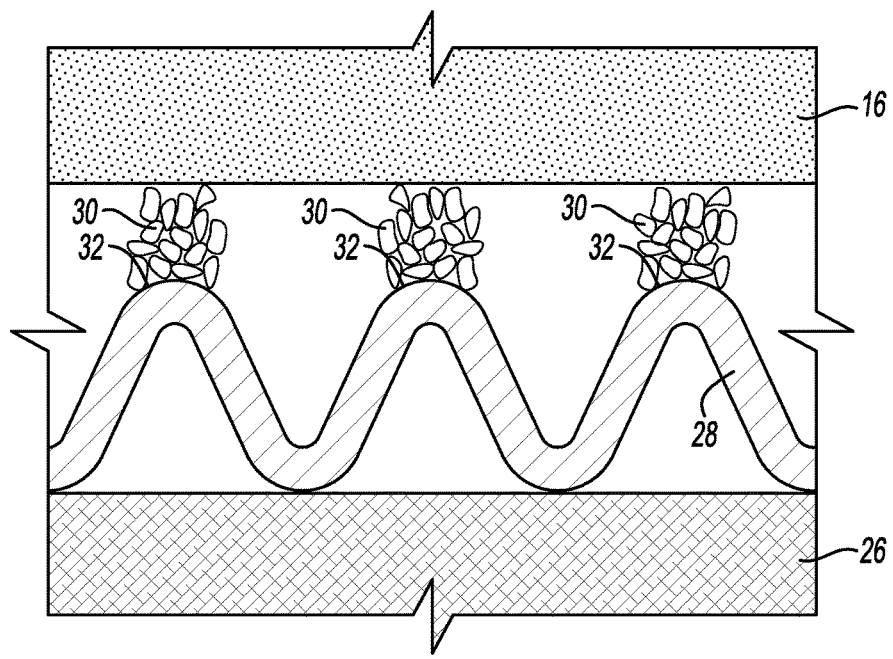
Figure 2C:
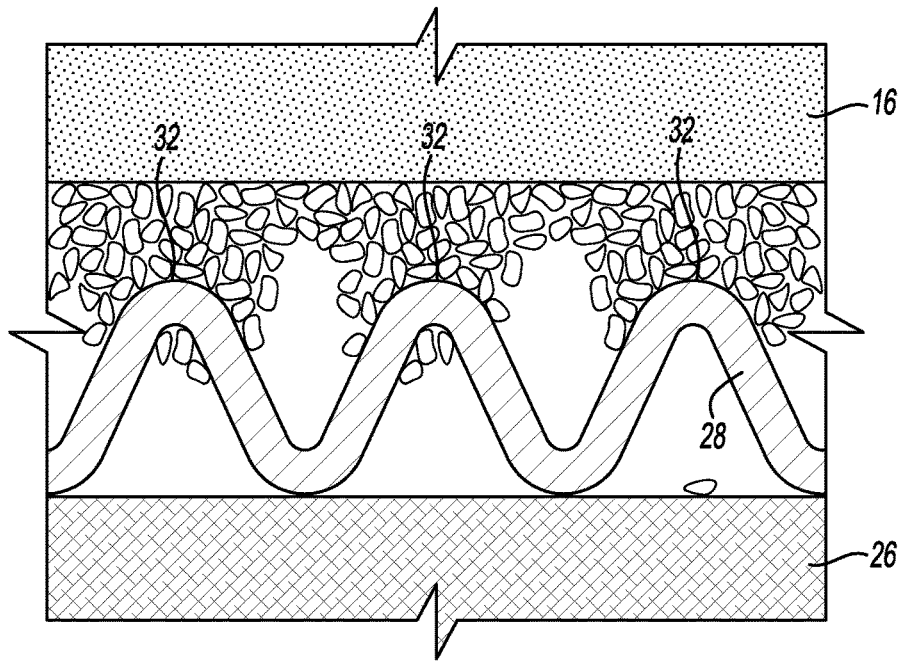
Figure 2D:
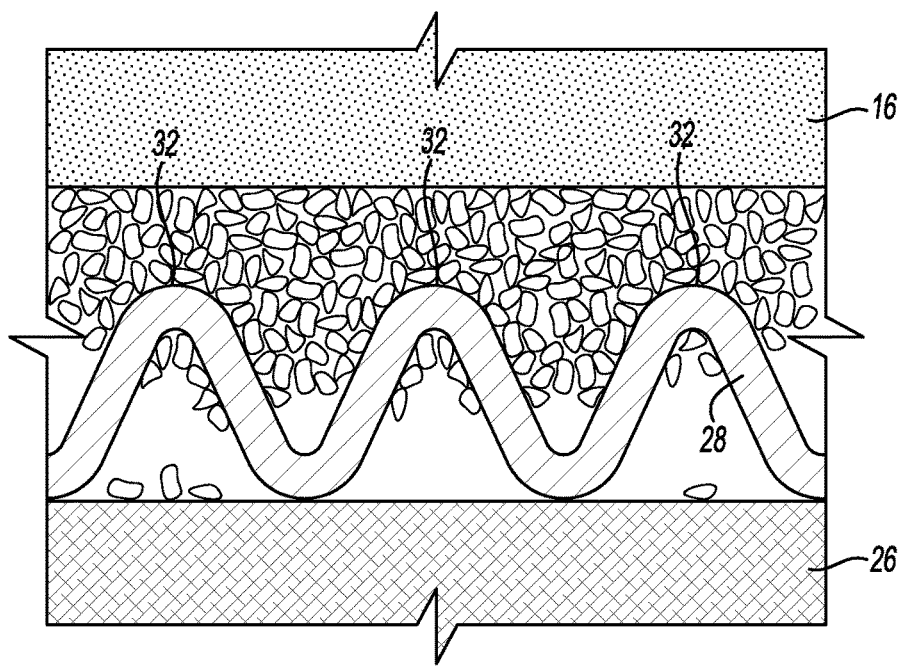

FIGS. 2A-2D show the build-up of metal deposits on the flow screen 28 over time. At the beginning of a charge cycle (FIG. 2A), the flow screen 28 is largely free of metal particles (assuming full discharge initial conditions). Columns of metal particles 30, however, begin to form during charge between apexes 32 of the flow screen 28 and the separator 16 (FIG. 2B). As the plating process continues, gaps between the flow screen 28 and separator 16 begin to fill with additional metal particles (FIG. 2C). Some deposit of metal particles may occur between the flow screen 28 and anode 26 near full charge conditions (FIG. 2D). The amount of these deposits is limited, however, due to the electrical shielding provided by the flow screen 28 and strengthened by the metal particles between the flow screen 28 and separator 16. As a result, flow over the anode 26 remains largely un-impeded even at full charge conditions.

The distance "A" between the apexes 32 and the separator 16, in the example of FIGS. 2A-2D, is less than the distance "B" between the apexes 32 and the anode 26. This dimension can be selected to yield desired results based on cell design, expected operating conditions, etc. Likewise, the number of ridges, the linear distance between each peak and valley, as well as other flow screen design characteristics can be selected to yield the desired results. For example, the linear peak-to-peak distance my be in the range of ¼ inch, the linear peak-to-valley distance may be in the range of ⅛ inch, the linear separator-to-anode distance may be in the range of 150 thou, and the flow screen stock may have a thickness in the range of 15 thou.

Figure 3:
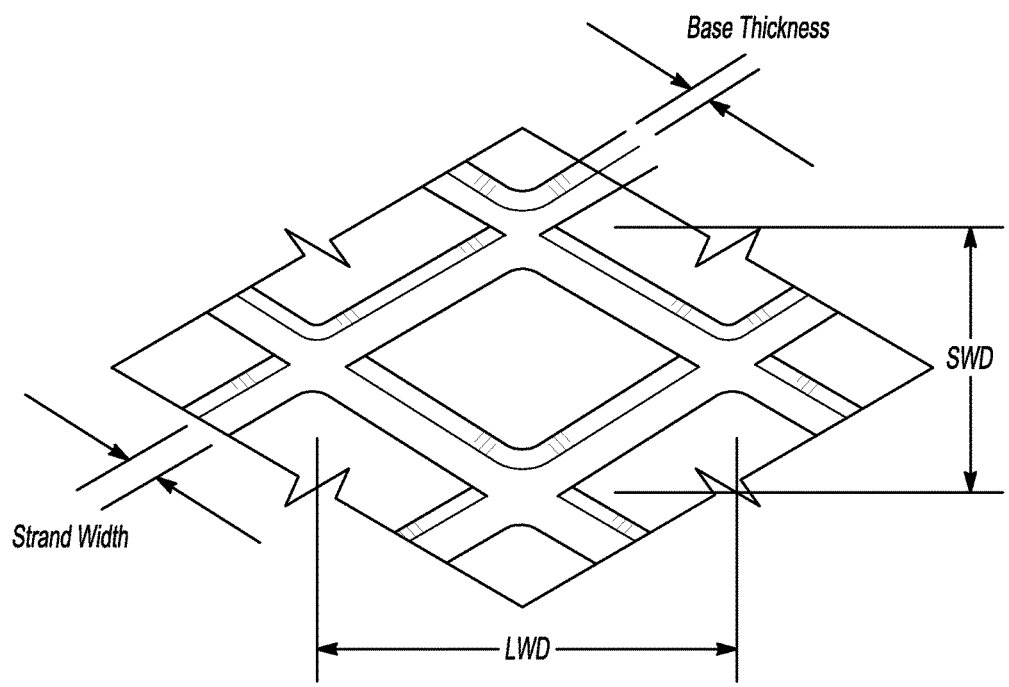
FIG. 3 is a schematic diagram of expanded metal stock.

As mentioned above, certain corrugated flow screens may be constructed from expanded metal (although other materials may be used). FIG. 3 shows several characteristic parameters associated with expanded metal stock: base thickness, strand width, nominal dimension short way of design (SWD), and nominal dimension long way of design (LWD). In the example of FIGS. 2A-2D, the parameter values were as follows: base thickness—0.015", strand width—0.025", SWD—0.060", LWD—0.16". Other dimensions, of course, can be used. Table 1 provides example ranges for these parameters.

TABLE 1

Example Expanded Metal Stock Parameters

| Parameter | Example Range |
|---|---|
| Base Thickness | 0.005"-0.030" |
| Strand Width | 0.010"-0.060" |
| SWD | 0.030"-0.120" |
| LWD | 0.080"-0.32" |

Figure 4:
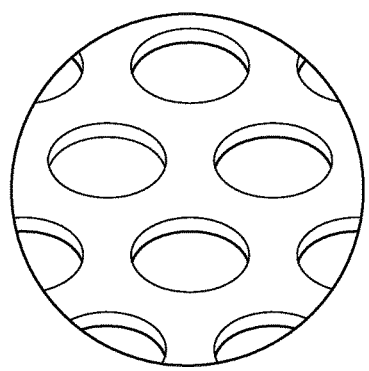
FIG. 4 is a schematic diagram of perforated metal stock.
Figure 5:
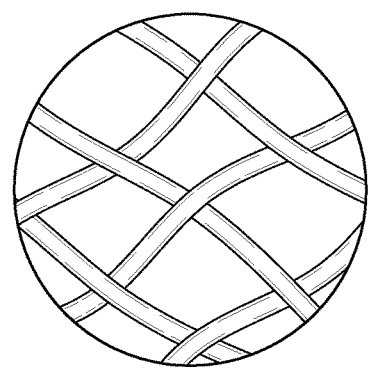
FIG. 5 is a schematic diagram of wire mesh stock.

As mentioned above, other materials may be used to form corrugated flow screens. FIG. 4 is an example of perforated metal and FIG. 5 is an example of wire mesh that each may be used for such purposes.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A flow cell comprising:
   a housing defining anode and cathode cavities each configured to permit electrolyte flow therethrough;
   an anode disposed within the anode cavity;
   an ion conductive membrane separating the cavities; and
   an electrically conductive flow screen having a corrugated form, being in contact with the anode, and arranged within the anode cavity such that the flow screen is configured to provide an electric shield to limit metal plating between the flow screen and anode during charge, and peaks of the flow screen adjacent to the membrane are configured to provide preferential metal plating areas relative to valleys of the flow screen to promote deposition of metal on the peaks during charge.

2. The flow cell of claim 1, wherein a distance between the peaks of the flow screen and the membrane is less than a distance between the peaks of the flow screen and the anode.

3. The flow cell of claim 1, wherein the peaks of the flow screen adjacent to the membrane are configured to provide preferential metal plating areas relative to the valleys of the flow screen such that a strength of the electric shield increases as metal plating on the flow screen increases.

4. The flow cell of claim 1, wherein the flow screen is metal.

5. The flow cell of claim 4, wherein the flow screen is an expanded metal, a perforated metal, or a woven mesh.

6. A flow cell comprising:
   a separator and anode arranged to define a flow chamber configured to direct an electrolyte therethrough; and
   an electrically conductive corrugated flow screen, in contact with the anode, having peak portions proximate the separator configured to provide preferential metal plating areas relative to valleys of the flow screen to promote deposition of metal on the peak portions between the flow screen and separator during charge to form an electric shield that hinders deposition of metal between the flow screen and anode.

7. The flow cell of claim 6, wherein a distance between the peak portions and the separator is less than a distance between the peak portions and the anode.

8. The flow cell of claim 6, wherein a strength of the electric shield increases as deposition of metal between the flow screen and separator increases.

9. The flow cell of claim 6, wherein the flow screen is metal.

10. The flow cell of claim 9, wherein the flow screen is an expanded metal, a perforated metal, or a woven mesh.

11. A battery comprising:
a flow cell including a separator and anode defining a flow cavity, and an electrically conductive corrugated flow screen disposed within the cavity and electrically connected with the anode such that peaks of the flow screen, during charge, are configured to provide preferential metal plating areas relative to valleys of the flow screen to promote deposition of metal on the peaks between the separator and flow screen to form an electric shield to hinder deposition of metal between the anode and flow screen.

12. The battery of claim 11, wherein a distance between the peaks and the separator is less than a distance between the peaks and the anode.

13. The battery of claim 11, wherein a strength of the electric shield increases as deposition of metal between the separator and flow screen increases.

14. The battery of claim 11, wherein the flow screen is metal.

15. The battery of claim 14, wherein the flow screen is an expanded metal, a perforated metal, or a woven mesh.

* * * * *